Feb. 15, 1944. C. W. MOTT ET AL 2,341,804
TRACTOR MOUNTED IMPLEMENT
Filed Feb. 23, 1942 3 Sheets-Sheet 3
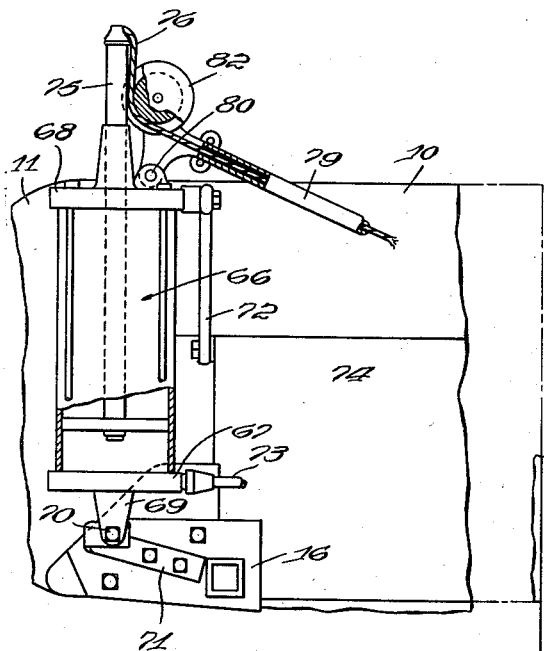
Fig. 3.
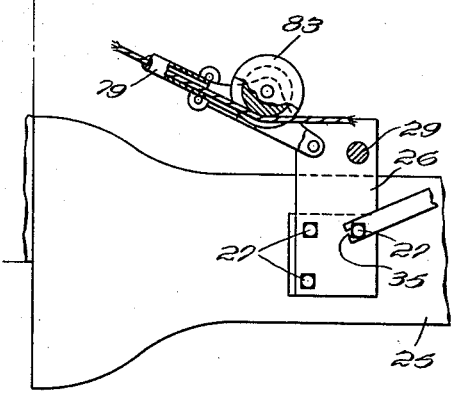
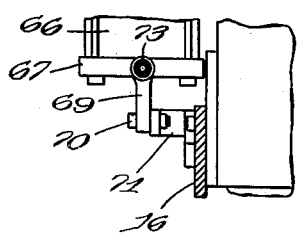
Fig. 4.
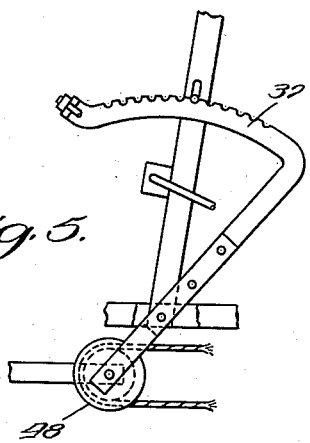
Fig. 5.
Inventors:
Carl W. Mott
and Hiram P. Smith.
By Paul O. Pippel
Atty.

Patented Feb. 15, 1944

2,341,804

UNITED STATES PATENT OFFICE 2,341,804

TRACTOR-MOUNTED IMPLEMENT

Carl W. Mott, La Grange, and Hiram P. Smith, Canton, Ill., assignors to International Harvester Company, a corporation of New Jersey Application February 23, 1942, Serial No. 431,952

13 Claims. (Cl. 97—50)

This invention relates to tractor-mounted implements and more particularly to power means for moving the working tools connected to the tractor of a tool-supporting structure for vertical movement from their working position to their transport position.

It is an object of the present invention to provide a novel arrangement for connecting fluid-expansible devices, deriving power from the tractor, to working tools on the tractor adapted for vertical movement, wherein the fluid-expansible devices may be located well removed from the working tools.

It is another object of the invention to provide an arrangement of the fluid-expansible devices forming a part of a power means for lifting implements, wherein the same will be so located on the tractor that the vision of the operator with respect to the working tools when in their working position is not impaired.

It is another object of the invention to provide a novel means for connecting working tools located respectively on forward and rearward portions of the tractor whereby the same may be jointly operated by the power-operated means.

It is still another object of the invention to provide a novel arrangement of a manually adjustable device used with ground-working implements.

According to the present invention, there are connected to the tractor on the forward and rearward portions thereof working tools adapted for vertical movement from their ground-working position to their transport position on the tractor. These working tools are connected to a lever structure pivoted on the rearward portion of the tractor, and this lever structure in turn is adapted to be operated by a vertically extending fluid-expansible device located on the forward portion of the tractor, from which extends a cable adapted to pass over a pulley wheel on the lever structure, and then to be anchored to the tractor. When the lever structure is operated by the cable, both of the working tools are lifted to their transport position. This lever structure carries two manually adjustable devices connected respectively with working tools located respectively at opposite sides of the forward portion of the tractor, wherein one of the working tools can be adjusted independently of the other. Immediately above the working tools at the forward portion of the tractor are laterally extending arms which are in turn pivoted on the tractor intermediate its forward and rearward portion by means of a bracket structure. This bracket structure is so located that, with its connecting means, it serves as a means for attaching a part of the supporting structure to the lever structure. Extending between the upper end of the fluid expansible device and about a portion of the cable is a hollow sleeve member having pulley wheels located at opposite ends of the same. This sleeve member is attached to the bracket structure for the lifting arms of the forward working tools, whereby this bracket structure serves as a means for connecting with the tractor not only the lifting arms and part of the supporting structure for the lever structure but also for the connecting of the hollow sleeve guide member. This hollow sleeve guide member, in addition to serving as a guide for the cable, also serves as a brace for the upper end of the fluid-expansible device thereby eliminating the necessity for rugged bracing of the same with the forward portion of the tractor. In the connections of the rearward working tool with the lever structure, there is provided a novel manual adjusting means which is entirely supported by one of the connecting links making up the connecting means for the rearward working tool with the lever structure. With the adjusting means forming a part of the connecting element, the same is connectable with the rearward working tool as a unit. The end of the cable is connected to the tractor through the supporting means for the lever structure, whereby, upon the removal of the supporting structure from the lever structure, the connecting point of the cable would be removed from the tractor with it.

For other objects and for a better understanding of the invention reference may be had to the following detailed description taken in connection with the accompanying drawings, in which:

Figure 3 is a fragmentary and detailed view of the fluid-expansible device and of the guiding means as it is connected between the fluid-expansible device and the bracket structure on the tractor;

Figure 4 is a detailed view of the lower end of the fluid-expansible device and illustrating its connection with the tractor; and Figure 5 is a detailed view of a portion of the lever structure and of its manually adjustable means thereon.

Figure 1:
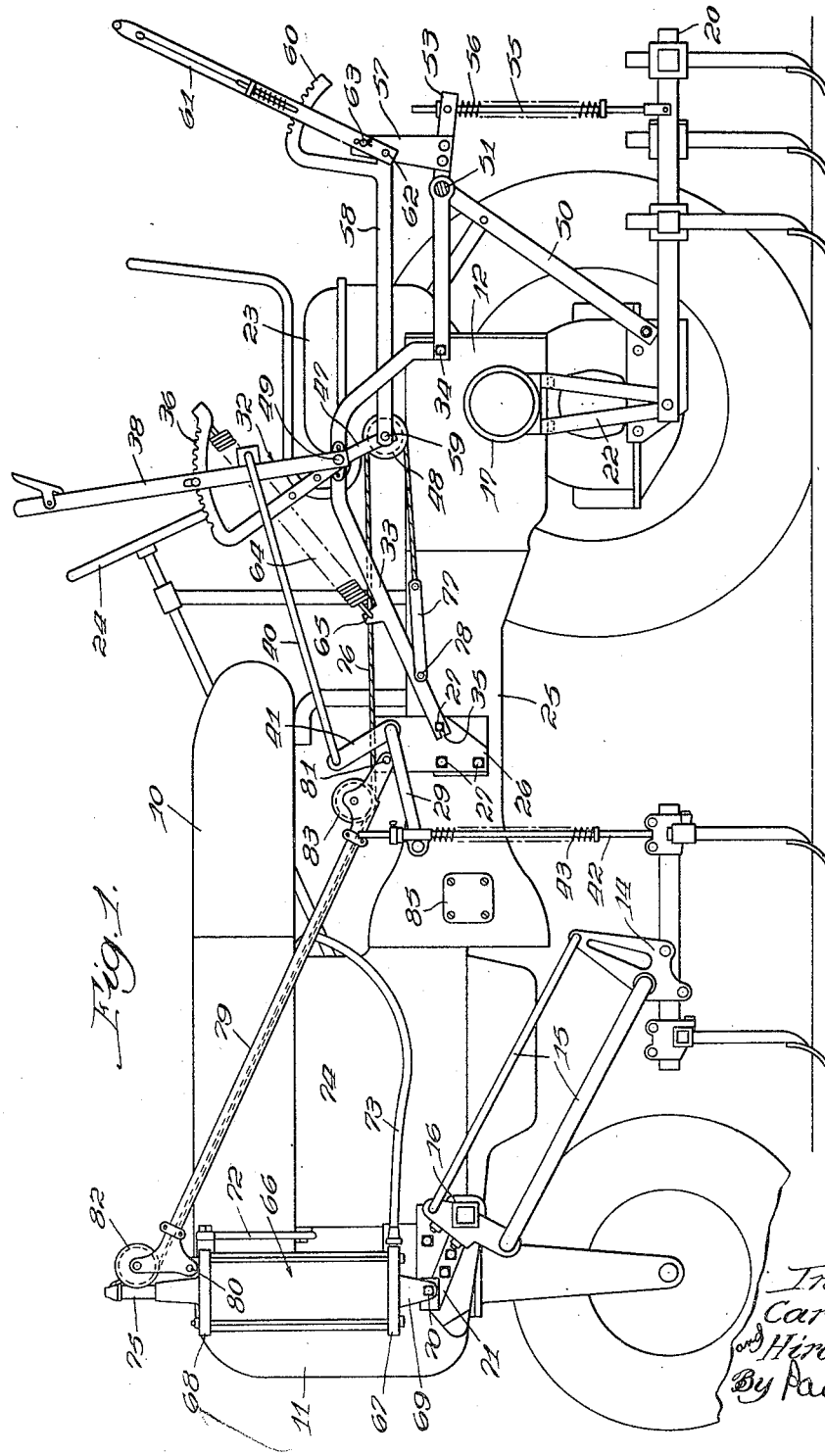
Figure 1 is an elevational view of the tractor with one rear wheel removed and with a tractor-mounted implement and power means embodying the features of the present invention connected to it.
Figure 2:
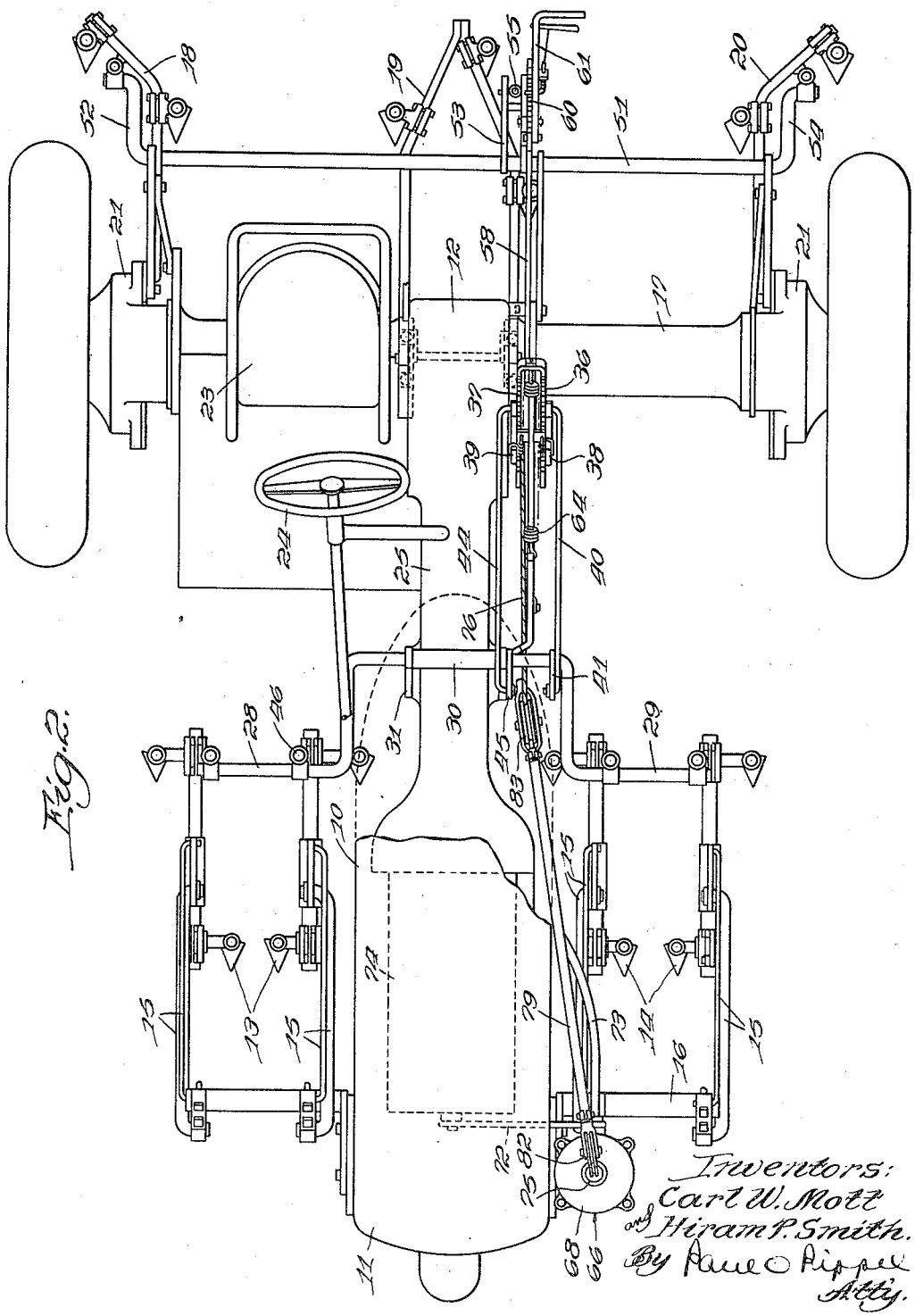
Figure 2 is a plan view of the tractor and implement and showing the working tools located at opposite sides of the forward portion thereof and at the rearward portion of the tractor.

Referring now to Figures 1 and 2, there is shown a tractor 10 having a forward portion 11 and a rearward portion 12. Connected to the forward portion of the tractor at opposite sides thereof are working tools 13 and 14, respectively, at the right and left sides thereof. These working tools are connected to the forward portion of the tractor for vertical movement from a ground-working position to a transport position. The connection of these working tools includes upper and lower parallel links 15 and a transversely extending bracket structure 16 extending laterally from the sides of the tractor and quickly attachable thereto by means of attaching screws.

To the rearward portion of the tractor is connected, at opposite sides thereof and directly behind a rear axle structure 17 forming a part of the rear portion of the tractor, a set of three transversely spaced working tools 18, 19, and 20. The two transversely spaced working tools 18 and 20 are pivotally connected to the depending axle structure 21 forming a part of the rear axle structure 17. The intermediate working tool 19 is connected underneath the center of the rear axle structure by means of a depending bracket structure 22. Each of these working tools, as well as the forward working tools, is adapted to have vertical movement from ground-working position to transport position.

On the rear axle structure 17 and offset from the center of the tractor toward the right, there is provided an operator's station 23 from which the operator may steer the steering mechanism 24. Extending forwardly from the transverse rear axle structure 17 is a longitudinally extending body portion 25 narrowed sufficiently to give the operator located on the operator's station 23 maximum vision of the working tools 13 and 14 on the forward portion of the tractor.

Intermediate the forward and rearward portions of the tractor and connected to the longitudinal portion 25 is a bracket structure 26. This bracket structure is connected to the tractor by means of attaching screws 27 whereby the bracket structure can be readily attached to the tractor or removed therefrom upon the implement being assembled or disassembled from the tractor. This bracket structure serves primarily to support lifting crank arms 28 and 29 extending laterally therefrom and pivotable with respect to the bracket structure and each of the same pivotable with respect to each other. The lifting arm 28 has on its inner end a sleeve 30 in which is pivoted the inner end of the lifting arm 29, whereby the two lifting arms can be pivoted with respect to each other. There is a bracket structure 31 similar to the bracket structure 26 at the opposite side of the tractor, whereby the lifting arms 28 and 29 will be retained for this pivotal movement. Thus, with the two bracket structures 26 and 31, the lifting arms are supported on the tractor.

Accessible to the operator's station 23 is a lever structure, indicated generally at 32, and connected to the tractor by a supporting means 33, which extends longitudinally of the tractor and which is connected to the rearward portion thereof, as indicated at 34. The forward portion of the supporting means 33 is connected to the tractor by means of the bracket structure 26 and its connecting screws 27. It will be noted that this supporting means includes generally merely a single longitudinally extending frame piece, the forward end of which has a slot 35 adapted to slide under the attaching screw 27 for the bracket structure 26.

This lever structure includes a pair of pivoted quadrants 36 and 37, over which respectively associated levers 38 and 39 are operable. The lever 38 is connected by a connecting link 40 with an arm 41 extending upwardly from the lifting arm 29. As the lever 38 is adjusted over its quadrant 36, the working tool 14 will be adjusted, inasmuch as the lifting structure 29 is connected to the working tool 14 by a lift rod 42. This lift rod 42 has a pressure spring device 43 adapted to maintain the working-tool structure in its ground-working position.

The lever 39 is adapted to work over the quadrant 37 and is connected to the lifting arm 28 by means of a connecting rod 44 connected to an arm 45 on the lift rod 28. The lift rod 28 is in turn connected with the working tools 13 through a lift rod 46, likewise having a pressure spring means similar to the pressure spring means 43 on the lift rod 42. It should now be apparent that the working tools 13 and 14 can be independently adjusted in their ground-working position. On a downward extension 47 of the pivoted quadrant 36, which is part of the lever structure, there is connected a pulley wheel 48. The lever structure, including the manual adjusting devices, is adapted to be pivoted about a pivot 49 on the lever-supporting means 33.

On the rearward portion 12 of the tractor is a rock-shaft supporting structure 50 having a pivotal rock-shaft 51. This rock-shaft is connected by rearwardly extending lifting arms 52, 53, and 54, respectively, with the working tools 18, 19, and 20, by means of lift rods 55 having pressure springs 56. As shown more clearly in Figure 1, the arm 53 has an upwardly extending portion 57 to which is connected a connecting element 58. The connecting element 58 is connected to the downwardly extending portion 47 of the lever structure, as indicated at 59. The connecting element 58 has formed on its rearward end a quadrant portion 60 and a lever 61 pivoted at 62 and adapted to work over the quadrant 60. It should thus be apparent that the connecting element 58 supports and carries a complete manually adjustable device including a quadrant and lever. The connecting element is then connected with the upwardly extending portion 57 through a pin connection 63 on the lever 61.

In order to render the pressure springs 43 and 56 of the forward and rearward tools effective, there is provided a master spring 64 connected to the quadrants 36 and 37 on the lever structure and to the supporting means 33, as indicated at 65. The spring 64 tends to rotate the lever structure in a counter-clockwise direction, thereby causing the connecting elements to be sufficiently rigid so that the pressure springs 43 and 56 will be effective upon the working tools. It should be noted that this spring 64 will be removable from the tractor with the supporting means 33 and need not be separately connected upon the same being removed from the tractor.

Coming now more particularly to the main features of the invention, there is provided a power means including a fluid-expansible or actuating device 66. This fluid-expansible device 66 has a lower portion 67 and an upper portion 68. The lower portion 67 is connected to the bracket structure 16 on the forward portion of the tractor in a manner shown more clearly in Figure 4. The lower portion 67 has a depending connecting element 69 which is connected by a bolt means 70 to a laterally extending arm 71, which is in turn formed as a part of the transverse supporting bracket structure 16. Through this connection, the fluid-expansible device 66 would be free for pivotal movement in a fore and aft direction, were it not for the upper portion 68 being connected to the tractor by a link 72, which serves to thereby prevent fore and aft pivotal movement of the fluid-expansible device 66. In this manner the fluid-expansible device is more or less braced against fore and aft movement on the tractor. In having the fluid-expansible device so located and arranged on the forward portion of the tractor, the same will be located in a position removed from the working tool so as not to interfere with their operation and also so located as to not interfere with the vision of the operator with respect to the working tools as the operator sits on the operator's station 23.

The particular fluid-expansible device 66 is adapted to receive fluid through a hose coupling 73. This fluid may be that provided by a fluid pump or may be preferably supplied from the tractor engine 74. For a showing of a fluid supply arrangement from an engine, see the pending application of Carl W. Mott, Serial No. 407,559. As the fluid is received from the hose 33, the fluid-expansible device is expanded and its piston rod 75 is thrust upwardly.

To the upper end of the piston rod 75 there is connected a cable 76 extended rearwardly to the rearward portion of the tractor and over the pulley wheel 48 on the lever structure 32 and thence connected by a connecting element 77 to the supporting means 33, as indicated at 78. It should thus be apparent that, upon the connecting element 77 being connected to the supporting means 33, it is in effect connected to the tractor by means of the bracket structure 26 and its connecting means 27.

As a guiding means for the cables 76, there is a hollow sleeve guide structure 79. This hollow tube structure 79 is connected to the upper portion 68 of the fluid-expansible device 66, as indicated at 80. It is connected at its rearward end to the bracket structure 26, as indicated at 81. The cable 76 runs through the sleeve 79 and over pulleys 82 and 83 located respectively on the forward and rearward ends of the hollow sleeve guide structure 79. The pulleys 82 and 83 serve to center the cable 76 in its alinement through the hollow sleeve 79.

Inasmuch as the sleeve structure 79 is connected between the upper portion 68 and the bracket structure 76, the latter of which is connected to the tractor, it should be apparent that the hollow sleeve structure thus serves as a bracing means for the upper portion of the fluid-expansible device, thereby eliminating the necessity for the brace 72 to be of maximum size. Furthermore, inasmuch as this sleeve structure 79 is connected to the bracket structure 26, it should be apparent that the bracket structure 26 not only serves as a means for connecting the supporting means 33 and the lifting arms 28 and 29 but also as a means for connecting the guiding sleeve structure 79 to the tractor.

It should now be apparent that there has been provided an arrangement of the power means and adjusting mechanism adapted for the lifting and adjusting of the working tools which is so arranged on the tractor as not to give interference to the working tools. The hollow sleeve structure 79 is of such diameter and so located snugly against the side of the tractor as not to interfere with other structures not shown in the drawings but of a type adapted to be connected to a connecting portion 85 on the side of the tractor. For instance, seed or fertilizing dispensers might well be located on the portion 85 and be free of the power means adapted for operating or lifting the working tools. The lever structure is supported on the tractor by a simple means and consumes little lateral space on the tractor and yet is still accessible to the operator's station 23, and is so conveniently located that the rearward working tools may be easily connected with the same, whereby they may be lifted in unison without forward tools.

While various changes may be made in the detail arrangement, it should be understood that such changes shall be within the spirit and scope of the present invention as defined by the appended claims.

What is claimed is:

1. In combination, a tractor having forward and rearward portions, working tools connected to the respective portions of the tractor for vertical movement from a working position to a transport position, a bracket structure and means for connecting the same on the tractor intermediate the forward and rearward portions thereof, a lifting arm carried by the bracket structure and connected to the forward working tool, a lever structure, a second bracket for pivotally supporting the lever structure, structure connected in part to the rearward portion of the tractor and in part to the first mentioned bracket structure connecting means, and power means for lifting the working tools operatively connected to the lever structure and including a vertically extending cylinder device connected at its lower end to the forward portion of the tractor, and bracing means for the upper end of the cylinder device connected to said first mentioned bracket structure, whereby said first mentioned bracket structure and its connecting means serve as a common means for connecting of the lifting arm, the second bracket structure, and the bracing means to the tractor.

2. In combination, a tractor, working tools respectively connected to the tractor at opposite sides thereof for vertical movement, a lever structure including manually adjustable devices connected respectively to the working tools, whereby one may be adjusted independently of the other, a pulley wheel carried by the lever structure, and power means for lifting the working tools in unison including a cable extending about the pulley wheel and anchored to the tractor.

3. In combination, a tool-supporting structure, a working tool connected to the tool-supporting structure for movement from one position to another position, power means for moving the working tool including a fluid-expansible device and means for connecting the same to the working tool, a cable extending from the fluid-expansible device, rigid means for guiding the cable over a portion of its length, and means for so connecting the guiding means between the fluid-expansible device and the tool-supporting structure that the guiding means serves as a brace in the connecting of the fluid-expansible device with the tool-supporting structure.

4. In combination, a tool-supporting structure, a working tool connected to the tool-supporting structure for movement from one position to another position, power means for moving the working tool including a fluid-expansible device and means for connecting the same to the working tool, a cable extending from the fluid-expansible device, a hollow sleeve structure having pulley wheels located respectively at each end thereof, said cable extending through the hollow sleeve structure and over its pulley wheels, and said hollow sleeve structure connected between the fluid-expansible device and the tool-supporting structure to serve as a brace for the fluid-expansible device.

5. In combination, a tractor, a ground-working tool connected to the tractor for vertical movement from a ground-working position to a transport position, power means connected to the working tool for lifting the same to a transport position, said power means including a vertically disposed fluid-expansible device having lower and upper portions, said device connected by its lower portion directly to the tractor, a cable extending from the upper portion of the fluid-expansible device, rigid means for guiding the cable over a portion of its length, and means for so connecting the guiding means between the upper portion of the fluid-expansible device and the tractor that the guiding means serves as a brace for the upper portion of the fluid-expansible device.

6. In combination, a tractor having forward and rearward portions, a ground-working tool connected to the forward portion of the tractor for vertical movement from a ground-working position to a transport position, an operator's station on the rearward portion of the tractor, a lever structure located on the rearward portion of the tractor, manually adjustable means carried by the lever structure and accessible to the operator's station, said manually adjustable means connected to the ground-working tool, a pulley wheel on the lever structure, power means adapted to operate the lever structure to effect lifting of the ground-working tool to a transport position, said power means including a fluid-expansible device connected to the forward portion of the tractor and arranged to extend vertically, a cable extending from the fluid-expansible device and adapted to extend over the pulley wheel of the lever structure and to be anchored to the tractor, means for guiding the cable throughout a portion of its length, and means for so connecting the guiding means between the fluid-expansible device and the tractor as to render the same effective as a brace for the fluid-expansible device.

7. In combination, a tractor having forward and rearward portions, ground-working tools connected respectively to the forward and rearward portions of the tractor for vertical movement from their ground-working positions to their transport positions, a lever structure located on the rearward portion of the tractor, a pulley wheel on the lever structure, each of the respective working tools operatively connected to the lever structure, power means adapted to operate the lever structure to effect lifting of the ground-working tools to their transport positions, said power means including a fluid-expansible device connected to the forward portion of the tractor to extend vertically thereon, a cable extending from the fluid-expansible device adapted to extend over the pulley wheel of the lever structure and to be anchored to the tractor, means for guiding the cable throughout a portion of its length, and means for so connecting the guiding means between the fluid-expansible device and the tractor as to render the same effective as a brace for the fluid-expansible device.

8. In combination, a tool-supporting structure, a tool connected to said structure for depth adjustment within a ground-working range and for lifting above said range, a quadrant pivotally mounted on said structure, a lever associated with said quadrant and lockable thereto for pivotal movement therewith, tool-connecting means between said lever and the tool and operable to lower the tool when the lever and quadrant are pivoted in one direction and to raise the tool when the lever and quadrant are pivoted in the opposite direction, an actuating device on said structure, actuating-device connecting means between said quadrant and said actuating device and operable by said actuating device to pivot the quadrant and lever in said opposite direction for raising the tool when the lever is locked to the quadrant, said actuating device also being operable through said actuating-device connecting means to determine the amount of pivotal movement of the quadrant and lever in said one direction and thus limit the depth of the tool in the ground-working range while the lever is locked to the quadrant, hold-down spring means reacting upon said tool-supporting structure and upon the quadrant to constantly urge the latter to pivot in said one direction for lowering the tool to said limit, and said lever being adjustable over said quadrant to change their relative pivoted positions and thereby change the tension of said spring.

9. In a vehicular implement including a frame, an earth-working tool connected with said frame for elevation from an earth-working position, and a tool-lifting assembly upon said frame comprising an operating part movable to operate said assembly for elevating said tool; the combination of a motor device spaced upon the frame from said operating part, said motor device comprising a work member movable upon energization of said motor device, a longitudinally channeled brace member extending between said motor device and an anchorage on said frame and generally toward said operating part, and a cable having a flight extending from said work member lengthwise through said channel to said operating part and movable lengthwise within said channel pursuant to movement of said work member to impart movement to said operating part for elevating the tool.

10. In a vehicular implement including a frame, an earth-working tool connected with the frame for elevation from an earth-working position, and a tool-lifting assembly upon said frame comprising an operating part movable to operate said assembly for elevating the tool; the combination of a motor device including a work member movable transversely of the direction said motor device is spaced from said operating part upon energization of said motor device, a longitudinally channeled brace member extending between said motor device and an anchorage on the frame disposed from said motor device generally toward said operating part, a cable pulley at and fixed with respect to the end of said brace member at the motor device, and a cable having a flight connected with said work member and extending therefrom about said pulley and thence lengthwise through said channel into force-transmitting relation with said operating part, and said transverse movement of said work member upon energization of the motor device causing lengthwise movement of the cable to impart movement to said operating part for elevating the tool.

11. In a power lift for a tool liftably associated with the frame of a tractor and including an operating part upon a portion of said frame spaced rearwardly from the front thereof and movable relatively thereto to cause lifting of the tool; the combination of a motor upon a front portion of the frame, said motor including a piston rod movable generally vertically incident to energization of the motor, a longitudinally channeled brace member extending along a side of said frame between said motor and an anchorage on the frame at a position spaced from the motor generally toward said operating part, a pulley in fixed relation with the motor, said pulley having a cable groove about its circumferential periphery in tangential relation to the channel in said brace member and partially embracing a portion of said piston rod for imparting stabilizing force thereto while forming a cable-receiving passage therewith, and a cable having a flight connected with an outer end portion of the piston rod and extending lengthwise thereof through said passage, about said pulley and axially through the channel in said brace member into force-transmitting relation with said operating part, and said generally vertical movement of the piston rod upon energization of the motor causing lengthwise movement of the cable to impart movement to said operating part for elevating the tool.

12. In a power lift for a liftable tool upon the frame of an implement, a motor upon said frame, said motor including a piston rod movable endwise upon energization of the motor, a longitudinally channeled brace member having an end connected to said motor and extending therefrom in transverse relation to the piston rod, a pulley journaled in fixed relation to the motor, said pulley having a cable groove about its circumferential periphery in tangential relation to the channel in said brace member and partially embracing a portion of the piston rod for imparting stabilizing force thereto while forming a cable-receiving passage therewith, and a cable having a flight connected with an outer end portion of the piston rod and extending lengthwise thereof through said passage, about said pulley and axially through said channel into force-transmitting relation with the tool, said endwise movement of the piston rod upon energization of the motor causing lengthwise movement of the cable, and the force-transmitting association of the cable with the tool being such as to cause lifting thereof pursuant to said lengthwise movement of the cable.

13. In a power lift for a liftable tool upon the frame of an implement; the combination of a lifting assembly connected with the tool and including a pivotal structure which when pivoted is operable of such assembly for lifting the tool, and means for pivoting said pivotal structure comprising a pulley journaled on said pivotal structure at a point removed from the pivot axis of said structure and revolvable about said axis to pivot said structure, a motor including a work member movable when the motor is energized, and a cable connected with said work member and extending therefrom to and about said pulley to form a live cable flight and continuing reversely from said pulley to an anchorage on said frame to form an anchored flight in general parallelism with said live flight, said work member being operable to advance the live flight theretoward upon movement thereof and the anchored flight thereupon cooperating with the live flight to revolve the pulley about said pivot axis for pivoting the pivotal structure as aforesaid.

CARL W. MOTT.
HIRAM P. SMITH.